(12) United States Patent
Kaskel

(10) Patent No.: US 6,914,602 B2
(45) Date of Patent: Jul. 5, 2005

(54) APPROXIMATING GRADIENTS WITH OFFSET MIDPOINTS

(75) Inventor: Bruce E. Kaskel, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 690 days.

(21) Appl. No.: 09/765,957

(22) Filed: Jan. 19, 2001

(65) Prior Publication Data
US 2002/0130882 A1 Sep. 19, 2002

(51) Int. Cl.$^7$ .............................................. G06T 15/00
(52) U.S. Cl. ...................................... 345/426; 345/419
(58) Field of Search ................................ 345/419–424, 345/426

(56) References Cited

U.S. PATENT DOCUMENTS 6,369,816 B1 * 4/2002 Knittel et al. ............... 345/424

* cited by examiner

Primary Examiner—Almis R. Jankus
(74) Attorney, Agent, or Firm—Fish & Richardson P.C.

(57) ABSTRACT

A method and computer program for approximating a gradient, the gradient defining a nonlinear transition from one color or gray level to another in an image where the rate of transition is determined by the function $y=x^e$ where $e>1$. The method includes identifying an error tolerance, selecting an optimal number of set points on a curve defined by the function including determining each set point by evaluating a maximum error between a line defined by a pair of set points and a corresponding portion of the curve using the error tolerance and approximating the curve by a series of linear portions connecting the set points.

20 Claims, 4 Drawing Sheets

APPROXIMATING GRADIENTS WITH OFFSET MIDPOINTS

TECHNICAL FIELD

This invention relates generally to computer graphics systems and more particularly to a method and apparatus for approximating an exponential gradient.

BACKGROUND

An exponential gradient is a non-linear transition from one color or gray level to another in a graphic image. The rate of transition for the exponential gradient can be described by a function y which is equal to $x^e$ where e is greater than 1. The exponential gradient can be used to describe the color change from a first point in the graphic image to a second point in the graphic image where each of the points has an associated color (gray) value. The transition from the first color value at the first point to the second color value at the second point is characterized by the function $y=x^e$.

When a computer graphics system (i.e., a raster image processor) processes an exponential gradient, the non-linear function ($y=x^e$) may be too difficult or time consuming to render. Exponential gradients can be approximated using a series of piece-wise linear segments. Part of the process includes determining a number of stops or stopping segment points for the approximation. Typically, the number of stops is pre-selected (a preset value for all exponential gradients that are processed for a given image) and results in an approximation that includes evenly divided segments. However, if there are too few linear stops, the approximation may be poor. If too many linear stops are created, both space and time will be wasted in the approximation process. Even if the proper number of stops is selected, the even distribution of the stops may likewise produce a poor approximation when a curvature of the original exponential gradient is significantly greater in one region than in another.

SUMMARY

In one aspect, the invention provides a method for a method for approximating a gradient, the gradient defining a nonlinear transition from one color or gray level to another in an image where the rate of transition is determined by the function $y=x^e$ where e>1. The method includes identifying an error tolerance, selecting a starting point and a set point on a curve defined by the function, defining a linear step from the start point to the set point and calculating a maximum error between the linear step and the curve. If the maximum error is less than or equal to the error tolerance, a portion of the gradient corresponding to the linear step is approximated with the linear step. If the maximum error is more than the error tolerance, a new set point on the curve closer to the starting point is selected and the calculating step and error checking steps are repeated.

Aspects of the invention can include one or more of the following features. The first set point selected can be an end point of the curve. The new set point selected can be half the distance between the set point and the starting point. The step of approximating the portion of the gradient can include determining if the set point is an end point for the curve. If the set point is not an end point for the curve, the set point can be set as a new starting point and the process can continue including selecting a new set point, else, the process ends and the gradient can be approximated using the defined linear steps. The new set point can be selected using the calculated maximum error. The new set point can be selected as being a point that corresponds to a linear step having a maximum error equal to the error tolerance. If the maximum error is less than the error tolerance, before approximating a portion of the gradient, the method can include continuing to select new set points on the curve beyond the first set point and repeating the calculating step until the maximum error associated with a new set point is equal to the error tolerance or the new set point is an ending point on the curve. Thereafter, a portion of the gradient corresponding to the linear step can be approximated with the linear step. The method can include checking to determine if the set point is an end point of the curve and, if not, approximating a second portion of the gradient including repeating the method with a previous set point as the starting point for a next approximation. The error tolerance can be a visual tolerance. The method can include using Newton's Method to select a set point on the curve to minimize the error between an approximation produced by the method and the curve.

In another aspect, the invention provides a method for approximating a gradient, the gradient defining a nonlinear transition from one color or gray level to another in an image where the rate of transition is determined by the function $y=x^e$ where e>1. The method includes identifying an error tolerance, selecting an optimal number of set points on a curve defined by the function including determining each set point by evaluating a maximum error between a line defined by a pair of set points and a corresponding portion of the curve using the error tolerance and approximating the curve by a series of linear portions connecting the set points.

In another aspect the invention can comprise a method for approximating a gradient, the gradient defining a nonlinear transition from one color or gray level to another in an image where the rate of transition is determined by the function $y=x^e$ where e>1. The method includes identifying an error tolerance, selecting an optimal number of linear stops on a curve defined by the function including using Newton's Method to recursively sub-divide the curve to find a next linear portion that approximates a corresponding portion of the curve within the error tolerance where each linear portion is defined by two linear stops, and locating subsequent linear stops until an end point of the curve is reached. The method includes approximating the curve by a series of linear portions connecting the linear stops.

In another aspect the invention provides a computer program stored on a tangible medium for approximating a gradient, the gradient defining a nonlinear transition from one color or gray level to another in an image where the rate of transition is determined by the function $y=x^e$ where e>1. The program includes instructions to identify an error tolerance, select a starting point and a set point on a curve defined by the function, define a linear step from the start point to the set point and calculate a maximum error between the linear step and the curve. If the maximum error is less than or equal to the error tolerance, a portion of the gradient corresponding to the linear step is approximated with the linear step. If the maximum error is more than the error tolerance, a new set point on the curve closer to the starting point is selected and the calculate and error checking instructions are repeated.

In another aspect the invention provides a computer program stored on a tangible medium for approximating a gradient, the gradient defining a nonlinear transition from one color or gray level to another in an image where the rate of transition is determined by the function $y=x^e$ where e>1.

The program includes instructions to identify an error tolerance, select an optimal number of set points on a curve defined by the function including determine each set point by evaluating a maximum error between a line defined by a pair of set points and a corresponding portion of the curve using the error tolerance and approximate the curve by a series of linear portions connecting the set points.

I another aspect, the invention provides a computer program stored on a tangible medium for approximating a gradient, the gradient defining a nonlinear transition from one color or gray level to another in an image where the rate of transition is determined by the function $y=x^e$ where $e>1$. The program includes instructions to identify an error tolerance, select an optimal number of linear stops on a curve defined by the function including use Newton's Method to recursively sub-divide the curve to find a next linear portion that approximates a corresponding portion of the curve within the error tolerance where each linear portion is defined by two linear stops and locate subsequent linear stops until an end point of the curve is reached. The program includes instructions to approximate the curve by a series of linear portions connecting the linear stops.

Aspects of the invention can include one or more of the following advantages. The system can generate only as many optimally located linear stops as required to approximate an exponential gradient within a given visual tolerance. The system can incorporate a recursive sub-dividing process to define an exponential curve. Linear portions that approximate corresponding portions of the exponential curve within a given error tolerance can be identified. The process is repeated until the end of the curve is reached.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
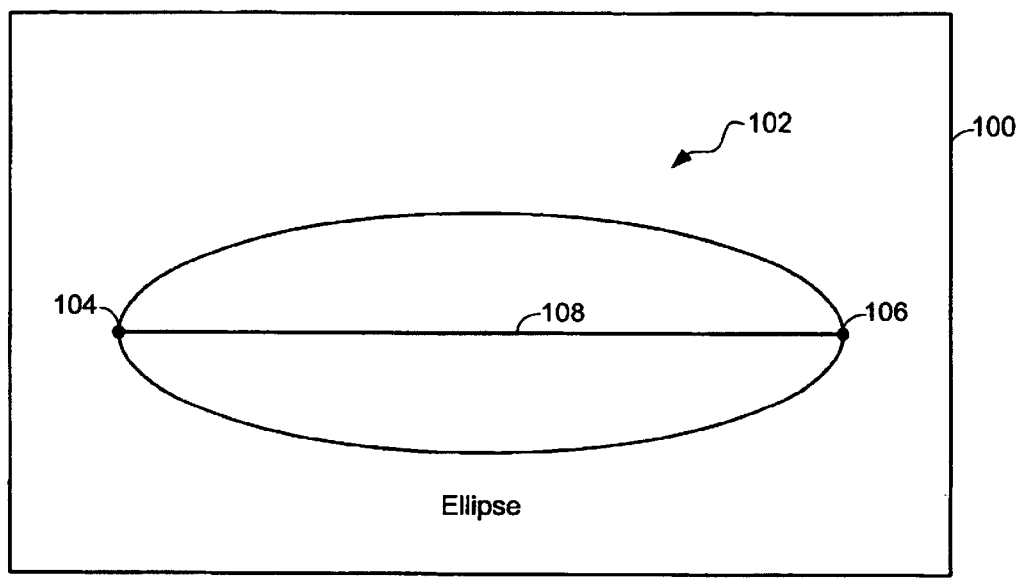
FIG. 1a shows an image that includes an object having a shading defined by an exponential gradient.
Figure 1B:
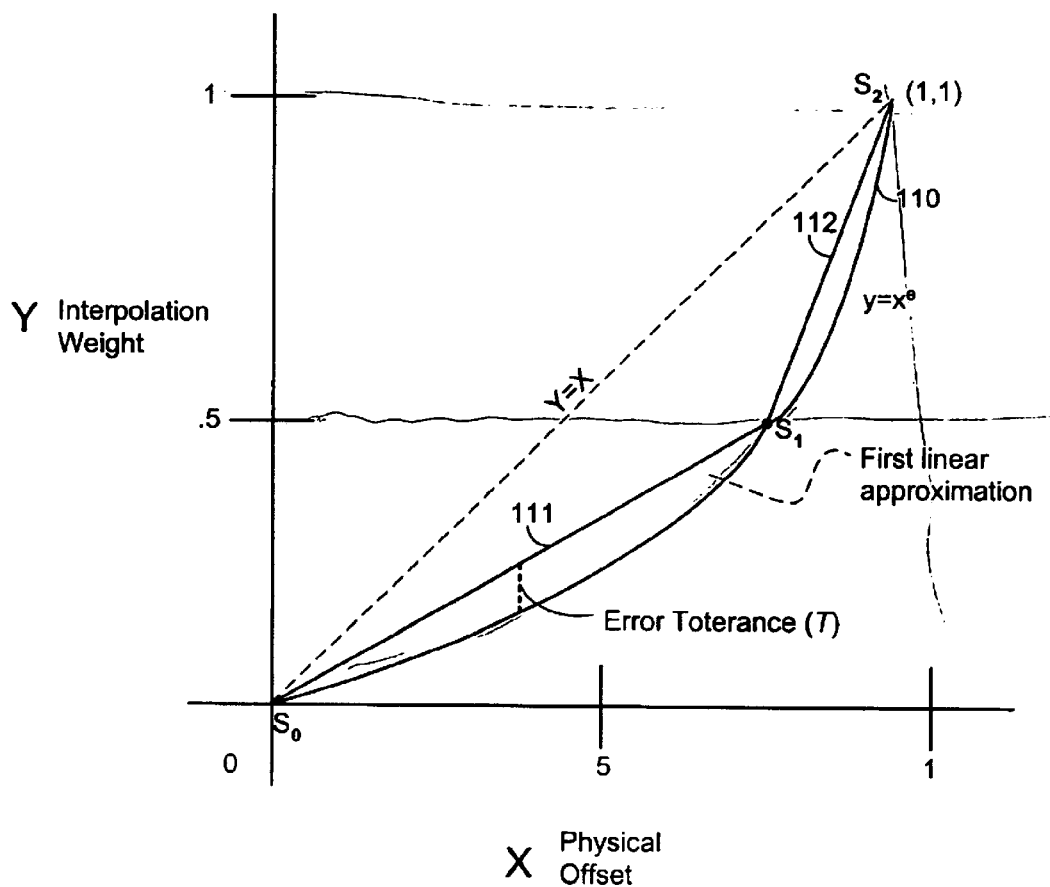
FIG. 1b shows a graphical representation for the exponential gradient.

Referring to FIG. 1a, an image 100 includes an ellipse 102 having two end points 104 and 106 running along the major axis 108 of ellipse 102. Each point includes color data, and more specifically a color value that describes the color of ellipse 102 at a respective point. A function can be used to describe the color transition for all other points in the ellipse. FIG. 1b shows a graph of a function (f(x)) for describing the color transition between points 104 and 106. The function f(x) define by curve 110 is an exponential gradient. For any point in the ellipse, the color can be computed as a mix of some percentage (the weighting factor) of each of the respective colors associated with the two points 104 and 106. The graph has been normalized in each access so that the distance and weights are scaled from 0 to 1 in each axis.

To determine the color for a given point (a target point), the system can locate the intersection of the physical offset (for the target point in the x-axis from the reference point (either point 104 or 106)) and the curve 110 to determine a weighting. The weighting determines the percentage of each color (the colors of points 104 and 106) used in producing the resultant color for the target point.

As described above, the y-axis of the graph represents the interpolation weight to be applied for a given point. The x-axis represents the physical offset location for points in the gradient. The graph of offset versus interpolation weight can be used to determine the color value for any point in the gradient. In this example, the graph defines a nonlinear transition from the color at a physical offset location 0 to the color at a physical offset of 1 or the end point of the gradient. The function f(x) can be approximated by a linear interpolation. Here, the function f(x), has been approximated by two segments: segment 111 that spans from point $S_0$ to $S_1$ and segment 112 that spans from point $S_1$ to point $S_2$. Associated with approximation is an error tolerance T. The error tolerance T defines a visual tolerance that is acceptable for a point in the linear approximation. $S_i$ defines an end point of a segment. The end point can be both an end point of a previous approximation segment and a starting point of a next approximation segment.

Figure 2:
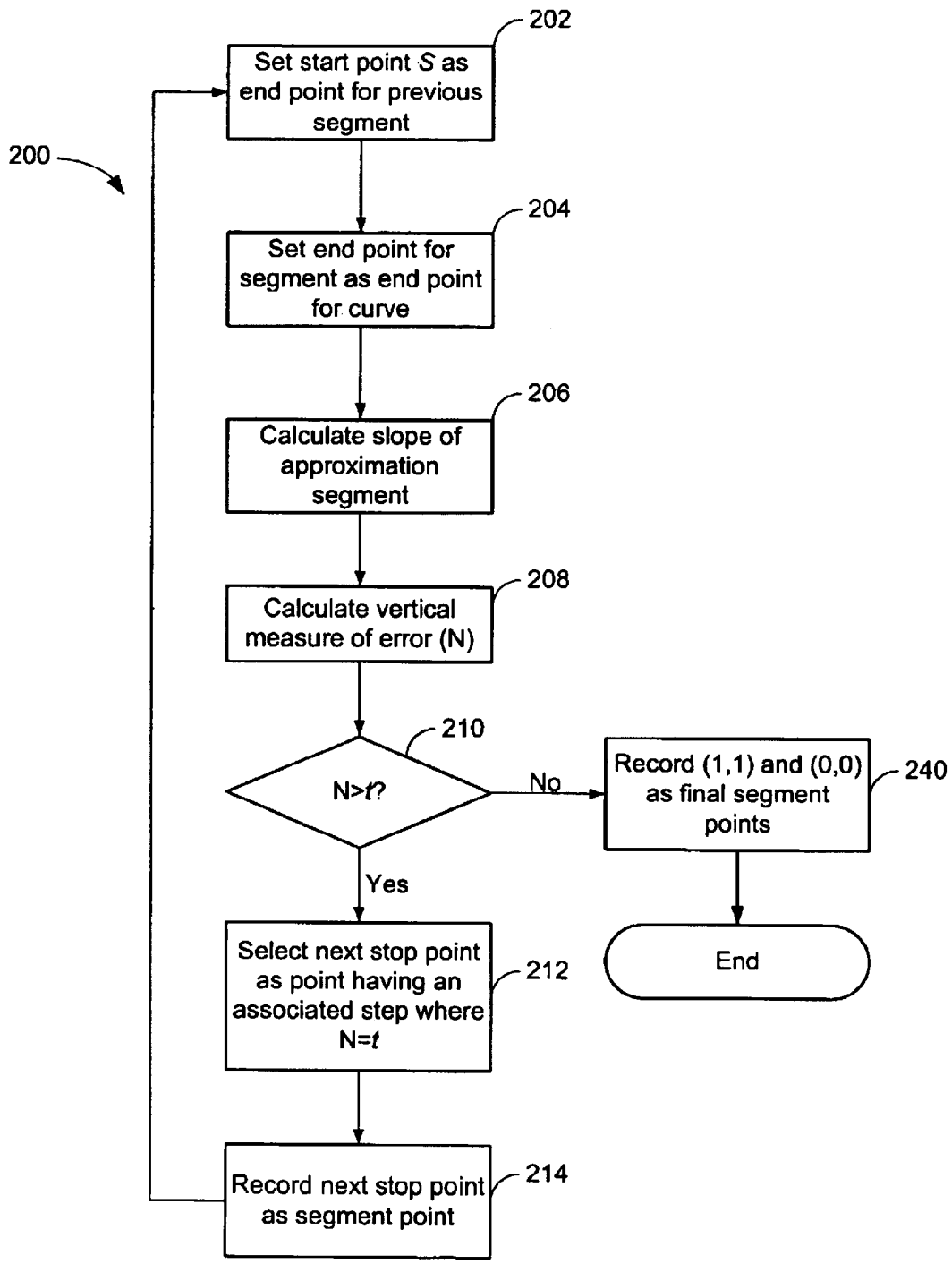
FIG. 2 is a flow diagram for a method for determining the optimal number of stops for a linear approximation for the exponential gradient of FIG. 1b.

FIG. 2 shows a method 200 for performing an approximation of the nonlinear gradient to produce the optimal number of stop points and as such an optimal number of approximation segments. The method begins by setting the start point $S_i$ for the current segment as the end point for the previous approximation segment (i.e., the last segment point recorded) (202). For the first segment, the start point is set to 0. The end point for the segment is set as the endpoint of the curve 110 (204). The slope of the approximation segment is calculated (206). The slope of the approximation can be calculated according to Equation 1.

$$m(x,s)=(x^e-s^e)/(x-s)$$

Thereafter, a vertical measure of error for the approximation segment is calculated (208). The vertical measure of error N is defined as the greatest error for any chosen value of x along the length of the approximation segment. The vertical measure of error from the approximation to the exponential can be defined according to Equation 2.

$$N(x,s) = s^e + (e-1) \cdot \left(\frac{m(x,s)}{e}\right)^{\frac{e}{e-1}} - sm(x,s)$$

A check is made to determine if the vertical measure of error for the approximation segment is greater than the predetermined error tolerance T (210). If not, then the process continues at step 240.

If the vertical measure of error exceeds the error tolerance T, then a next stop point between s and 1 is selected whose corresponding linear step has an error (vertical measure of error) at the tolerance limit (212). The next stop point is the stop point where the error calculated (in accordance with Equation 2) meets the error tolerance T. In order to determine the next stop point an iterative process can be applied. One implementation of an iterative process for determining the optimal next stop point is described in greater detail below in association with FIG. 3. Thereafter, the next stop point is recorded as a segment point (214) and the process continues at step 202.

In step 240, the end point (1,1) is recorded as final segment point along with the start point (0, 0) and the process completes. The segment points can be used to create the gradient stops associated with linear segments to be used in the approximation for the non-linear gradient. The linear interpolated gradient will approximate the original exponentially interpolated gradient. A gradient stop can be assigned for each recorded segment point. The offset for each gradient stop is the first coordinate of the associated segment point. The color of each gradient stop is the linear interpolated color between colors of the endpoints (points 104 and 106) and can be calculated using the second coordinate of the segment point as a linear weighting factor. This color can be represented symbolically as (1−t)×a+t×b where a and b are the colors respectively of the end points for the gradient (e.g., points 104 and 106 of FIG. 1*a*).

Figure 3:
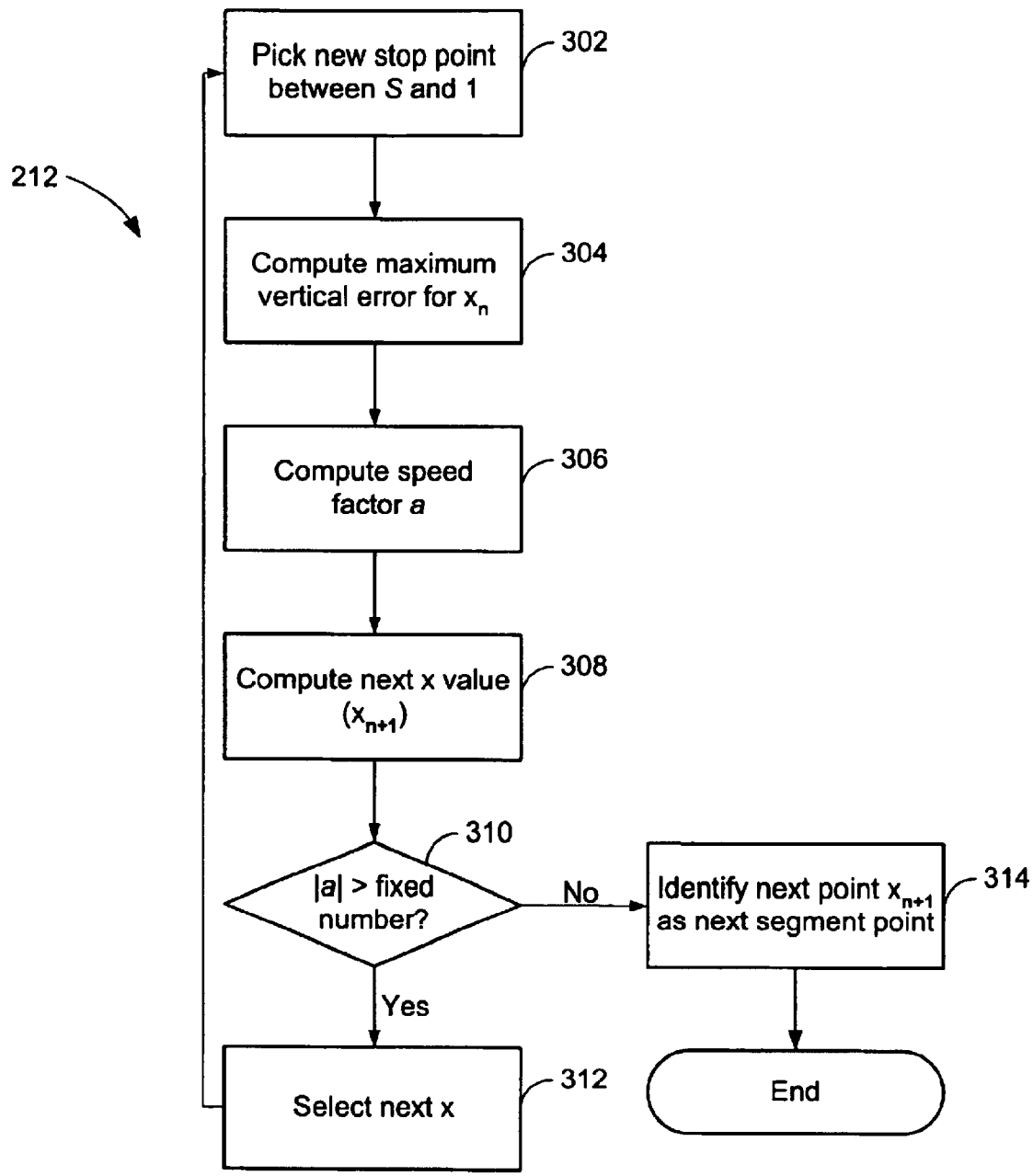
FIG. 3 is flow diagram for a method for selecting an optimal next segment point.

Referring now to FIG. 3, one implementation for selecting the next stop point (step 212 of FIG. 2) begins by picking a new stop point between $S_i$ and 1 (302). In one implementation, the new stop point can have an x value that is half way between $S_i$ and 1. Thereafter three values are computed. First a function needs to be introduced, referred to as the denominator, that is equal to the mathematical derivative of N (the vertical measure of error) with respect to x. The denominator defines the rate of change of the curve f(x). The derivative can be defined mathematically in accordance with Equation 3.

$$D(x, s) = \left(\left(\frac{m(x,s)}{e}\right)^{\frac{e}{e-1}} - s\right) \cdot \frac{ex^{e-1} - m(x,s)}{x - s}$$

The three values that are computed are, maximum vertical error for point $x_n$ (304), a speed factor a (306) and a next "x" value ($x_{n+}1$) (308). The speed factor a is equal to the error that was calculated for a given iteration minus the tolerance T divided by the derivative d where:

$$\frac{N(x_n, s) - T}{D(x_n, s)}$$

The next x value $x_{n+1}$ is equal to the current x value ($x_n$) minus the speed factor a where:

$$x_{n+1} = x_n \frac{N(x_n, s) - T}{D(x_n, s)}$$

Thereafter, a check is made to determine if the absolute value of the speed factor a is greater than a fixed value (310). In one implementation, the fixed value is a small non-negative number, such as 0.0001. If the absolute value is greater, then a next x is selected (n is increased by 1 where $x_n+1$, is selected closer to $S_i$) (312) and the process returns to step 304. Otherwise, the point ($x_{n+}1, x_{n+1}^e$) is recorded as the next segment point (314) and $S_i$ (the prior segment point) is set as $x_{n+1}$. In one implementation, the next "x" ($x_{n+1}$) is selected in accordance with Equation 5. Alternatively, the next x can be selected by again selecting a point that is half way between the last x ($x_n$) and the most recent x processed in the direction determined by the sign of the adjustment value a. This alternative process will not however move as quickly to the optimal next segment point. The process then continues as described above computing the greatest error associated with the next approximation segment. The iterative process described moves very quickly to the optimal next x (segment point) that has maximum error value that is exactly at the tolerance value. This is true because of how the error calculated is used to determine the next x point.

A number of embodiments of the invention have been described. Nevertheless, it will be understood that various modifications may be made without departing from the spirit and scope of the invention. Accordingly, other embodiments are within the scope of the following claims.

What is claimed is:

1. A method for approximating a gradient, comprising:
   receiving a gradient defining a nonlinear transition from one color or gray level to another in an image where the rate of transition is determined by a non-linear function;
   identifying an error tolerance;
   selecting a starting point and a set point on a curve defined by the function;
   defining a linear step from the start point to the set point;
   calculating a maximum error between the linear step and the curve;
   if the maximum error is less than or equal to the error tolerance,
      approximating a portion of the gradient corresponding to the linear step with the linear step,
   if the maximum error is more than the error tolerance,
      selecting a new set point on the curve closer to the starting point and repeating the calculating step and error checking steps.

2. The method of claim 1, wherein the first set point selected is an end point of the curve.

3. The method of claim 1, wherein the new set point selected is half the distance between the set point and the starting point.

4. The method of claim 1, wherein the step of approximating the portion of the gradient includes
   determining if the set point is an end point for the curve;
   if the set point is not an end point for the curve, setting the set point as a new starting point and continuing the process including selecting a new set point;
   else, ending the process and approximating the gradient using the defined linear steps.

5. The method of claim 1, wherein the new set point is selected using the calculated maximum error.

6. The method of claim 1, wherein the new set point is selected as being a point that corresponds to a linear step having a maximum error equal to the error tolerance.

7. A method for approximating a gradient, the gradient defining a nonlinear transition from one color or gray level to another in an image where the rate of transition is determined by the function $y=x^e$ where e>1, the method comprising:
   identifying an error tolerance;
   selecting a starting point and a set point on a curve defined by the function;
   defining a linear step from the start point to the set point;
   calculating a maximum error between the linear step and the curve;
   if the maximum error is less than or equal to the error tolerance,
      approximating a portion of the gradient corresponding to the linear step with the linear step,
   if the maximum error is more than the error tolerance,
   before approximating a portion of the gradient, continuing to select new set points on the curve beyond the first set point and repeating the calculating step until the maximum error associated with a new set point is equal to the error tolerance or the new set point is an ending point on the curve, then approximating a portion of the gradient corresponding to the linear step with the linear step; and if the maximum error is less than the error tolerance,
selecting a new set point on the curve closer to the starting point and repeating the calculating step and error checking steps.

8. A method for approximating a gradient, the gradient defining a nonlinear transition from one color or gray level to another in an image where the rate of transition is determined by the function $y=x^e$ where $e>1$, the method comprising:

identifying an error tolerance;

selecting a starting point and a set point on a curve defined by the function;

defining a linear step from the start point to the set point;

calculating a maximum error between the linear step and the curve;

if the maximum error is less than or equal to the error tolerance,
approximating a portion of the gradient corresponding to the linear step with the linear step, if the maximum error is more than the error tolerance,
selecting a new set point on the curve closer to the starting point, repeating the calculating step, and approximating a portion in accordance with the error tolerance;

checking to determine if the set point is an end point of the curve, and if not, approximating a second portion of the gradient including repeating the method with a previous set point as the starting point for a next approximation.

9. The method of claim 1, where the error tolerance is a visual tolerance.

10. The method of claim 1, further comprising using Newton's Method to select a set point on the curve to minimize the error between an approximation produced by the method and the curve.

11. A method for approximating a gradient, the method comprising:

receiving a gradient defining a nonlinear transition from one color or gray level to another in an image where the rate of transition is determined by the non-linear function;

identifying an error tolerance;

selecting an optimal number of set points on a curve defined by the function including determining each set point by evaluating a maximum error between a line defined by a pair of set points and a corresponding portion of the curve using the error tolerance; and approximating the curve by a series of linear portions connecting the set points.

12. A method for approximating a gradient, the method comprising:

receiving a gradient defining a nonlinear transition from one color or gray level to another in an image where the rate of transition is determined by a non-linear function;

identifying an error tolerance;

selecting an optimal number of linear stops on a curve defined by the function including
using Newton's Method to recursively sub-divide the curve to find a next linear portion that approximates a corresponding portion of the curve within the error tolerance where each linear portion is defined by two linear stops, and locating subsequent linear stops until an end point of the curve is reached; and approximating the curve by a series of linear portions connecting the linear stops.

13. A computer program stored on a tangible medium for approximating a gradient, the program including instructions to:

receive a gradient defining a nonlinear transition from one color or gray level to another in an image where the rate of transition is determined by a non-linear function;

identify an error tolerance;

select a starting point and a set point on a curve defined by the function;

define a linear step from the start point to the set point;

calculate a maximum error between the linear step and the curve;

if the maximum error is less than or equal to the error tolerance,
approximate a portion of the gradient corresponding to the linear step with the linear step, if the maximum error is more than the error tolerance,
select new set points on the curve closer to the starting point and repeat the calculating step and error checking stop.

14. A computer program stored on a tangible medium for approximating a gradient, the program including instructions to:

receive a gradient defining a nonlinear transition from one color or gray level to another in an image where the rate of transition is determined by a non-linear function;

identify an error tolerance;

select an optimal number of set points on a curve defined by the function including determine each set point by evaluating a maximum error between a line defined by a pair of set points and a corresponding portion of the curve using the error tolerance; and approximate the curve by a series of linear portions connecting the set points.

15. A computer program stored on a tangible medium for approximating a gradient, the program including instructions to:

receive a gradient defining a nonlinear transition from one color or gray level to another in an image where the rate of transition is determined by a non-linear function;

identify an error tolerance;

select an optimal number of linear stops on a curve defined by the function including use Newton's Method to recursively sub-divide the curve to find a next linear portion that approximates a corresponding portion of the curve within the error tolerance where each linear portion is defined by two linear stops, and locate subsequent linear stops until an end point of the curve is reached; and approximate the curve by a series of linear portions connecting the linear stops.

16. A method for approximating a gradient, the gradient defining a nonlinear transition from one color or gray level to another in an image where the rate of transition is determined by the function $y=x^e$ where $e>1$, the method comprising:

identifying an error tolerance;

selecting a starting point and a first set point on a curve defined by the function;

defining a linear step from the start point to the set point;

calculating a maximum error between the linear step and the curve;

if the maximum error is equal to the error tolerance, approximating a portion of the gradient corresponding to the linear step with the linear step, if the maximum error is less than the error tolerance, before approximating a portion of the gradient, continuing to select new set points on the curve beyond the first set point and repeating the calculating step until the maximum error associated with a new set point is equal to the error tolerance or the new set point is an ending point on the curve, then approximating a portion of the gradient corresponding to the linear step with the linear step.

17. The method of claim 16 further comprising:

if the maximum error is more than the error tolerance,
selecting a new set point on the curve closer to the starting point,
repeating the calculating step,
checking the error against the error tolerance, and
performing the approximating step in accordance with the error checking step.

18. A method for approximating a gradient, the gradient defining a nonlinear transition from one color or gray level to another in an image where the rate of transition is determined by the function $y=x^e$ where $e>1$, the method comprising:

identifying an error tolerance;

selecting a starting point and a set point on a curve defined by the function;

defining a linear step from the start point to the set point;

calculating a maximum error between the linear step and the curve;

if the maximum error is less than the error tolerance, continuing to select new set points on the curve beyond the first set point and repeating the calculating step until the maximum error associated with a new set point is equal to the error tolerance or the new set point is an ending point on the curve, then approximating a portion of the gradient corresponding to the linear step with the linear step.

19. The method of claim 18 further comprising:

if the maximum error is more than the error tolerance,
selecting a new set point on the curve closer to the starting point,
repeating the calculating step,
checking the error against the error tolerance, and
performing the approximating step in accordance with the error checking step.

20. A method for approximating a gradient, the gradient defining a nonlinear transition from one color or gray level to another in an image where the rate of transition is determined by the function $y=x^e$ where $e>1$, the method comprising:

identifying an error tolerance;

selecting a starting point and a set point on a curve defined by the function;

defining a linear step from the start point to the set point;

calculating a maximum error between the linear step and the curve;

if the maximum error is equal to the error tolerance, approximating a portion of the gradient corresponding to the linear stop;

if the maximum error is more than or less than the error tolerance, continuing to select new set points on the curve either nearer to the starting point or beyond the first set point and repeating the calculating step until the maximum error associated with a new set point is equal to the error tolerance or the new set point is an ending point an the curve, then approximating a portion of the gradient corresponding to the linear step with the linear step.

* * * * *

UNITED STATES PATENT AND TRADEMARK OFFICE
CERTIFICATE OF CORRECTION

PATENT NO. : 6,914,602 B2  
APPLICATION NO. : 09/765957  
DATED : July 5, 2005  
INVENTOR(S) : Bruce E. Kaskel Page 1 of 1

It is certified that error appears in the above-identified patent and that said Letters Patent is hereby corrected as shown below:

Column 6, line 55, delete "less than or";
          line 58, delete "step," and replace with --step;--;
          line 59, delete "more" and replace with --less--;
Column 7, line 3, delete "less" and replace with --more--;
Column 8, line 24, delete "stop" and replace with --step--;
Column 10, line 27, delete "stop" and replace with --step--;
           line 34, delete "an" and replace with --on--.

Signed and Sealed this

Twenty-eighth Day of August, 2007

JON W. DUDAS  
*Director of the United States Patent and Trademark Office*